May 8, 1945.    J. R. MORRIS    2,375,378
CUTTING MACHINE
Filed March 20, 1942    5 Sheets-Sheet 1

Fig. 1.

Inventor
JOSEPH. R. MORRIS.
By
Frank Fraser
Attorney

Fig. 2.

May 8, 1945. J. R. MORRIS 2,375,378
CUTTING MACHINE
Filed March 20, 1942 5 Sheets-Sheet 3

Inventor
JOSEPH R. MORRIS.
By Frank Fraser
Attorney

May 8, 1945. J. R. MORRIS 2,375,378
CUTTING MACHINE
Filed March 20, 1942 5 Sheets-Sheet 4

Inventor
JOSEPH R. MORRIS.
By Frank Fraser
Attorney

Patented May 8, 1945

2,375,378

UNITED STATES PATENT OFFICE 2,375,378

CUTTING MACHINE

Joseph R. Morris, Toledo, Ohio, assignor to Libbey-Owens-Ford Glass Company, Toledo, Ohio, a corporation of Ohio Application March 20, 1942, Serial No. 435,538

15 Claims. (Cl. 33—27)

The present invention relates to cutting machines in general and more particularly to a machine designed primarily for the cutting of glass sheets or plates, although it may also be used for the cutting of other sheet material.

While not necessarily restricted thereto, this invention is especially adaptable to cutting machines of the so-called template type designed to cut out shapes of predetermined outline from sheets or plates of glass. The machine set forth herein as a preferred embodiment of the invention is used for cutting out automobile window or door lights or half-windshields and produces a score line which starts and stops at the edge of the glass sheet describing an open pattern. Briefly, the machine embodies a table for supporting the glass sheet to be cut, a template or pattern member of predetermined shape and size mounted above said table, and a cutting unit mounted upon and movable along said template and having a cutting tool for effecting the scoring of the glass sheet along a predetermined line of cut.

It is an aim of this invention to provide an improved machine of the above character whereby large numbers of lights of the same size and shape can be successively cut from glass sheets or plates in a rapid, accurate and uniform manner.

Another object of the invention is the provision of a machine of the above character in which the operation of the cutting unit is controlled by and dependent upon the accurate positioning of the glass sheet upon the cutting table.

Another object of the invention is the provision of a machine of the above character embodying means for ejecting the glass sheet from the cutting table after the cutting operation.

A further object of the invention is the provision of a machine of the above character which is substantially automatic in its operation and in which the travel of the cutting unit upon the template is initiated by proper positioning of the glass sheet upon the cutting table, after which the cutting of the sheet, the stopping of the cutting unit after the cutting operation, and the removal of the cut sheet from the cutting table are accomplished without further action on the part of the operator.

A still further object of the invention is the provision of a machine of the above character embodying means for effecting an automatic oiling of the cutting tool after each cutting operation.

Other objects and advantages of the invention will become more apparent during the course of the following description, when taken in connection with the accompanying drawings.

In the drawings, wherein like numerals are employed to designate like parts throughout the same.

Briefly, the cutting machine of this invention comprises a table structure 15 including a flat horizontal top 16 for supporting the sheet or plate of glass or the like 17 during the cutting thereof; the top 16 of said table being preferably covered with a layer of felt or other cushioning material 18 to minimize scratching of the glass sheet during the placing thereof upon the table and its subsequent removal therefrom.

Arranged above the table top 16, in vertically spaced relation thereto, is a horizontal track template 19 having the same configuration as the form or light to be cut from the glass sheet 17. Mounted upon the track template 19 and guided thereby is the cutting mechanism including a cutting unit 20 provided with a rotatable steel cutting wheel 21 (Fig. 2); said unit being driven around the template by a motor 22 to score the glass sheet 17 along the line indicated at 23 in Fig. 1.

After the glass sheet 17 has been cut, it is adapted to be automatically ejected from the cutting table by a kicker device designated in its entirety by the numeral 24. Upon leaving the cutting table, the sheet is received upon a series of horizontally aligned conveyor rolls 25 journaled at their opposite ends in supports 26—26 and driven in the direction indicated by the arrow by means of a suitable chain and sprocket drive or the like 27. The glass sheet is received from the conveyor rolls 25 upon a take-off conveyor 28 provided with a traveling surface 29 for receiving the said sheet and carrying it away, preferably at substantially right angles relative to the cutting table.

In accordance with the invention, the travel of the cutting unit 20 around the template 19 is controlled by and dependent upon the accurate positioning of the glass sheet 17 upon the cutting table to start the motor 22. After the cutting operation has been completed, the cutting unit 20 is automatically brought to a stop and the kicker device 24 automatically actuated to remove the cut sheet from the cutting table. Means is also provided for placing the cutting tool upon the glass sheet to be cut slightly inwardly of the edge thereof at the beginning of the cutting operation and for also raising the cutting tool from the sheet just before it reaches the edge thereof at the completion of the cutting operation, whereby to prevent chipping or spalling of the sheet edge as well as damage to the cutting tool. Furthermore, means is provided for effecting an automatic oiling of the cutting tool between successive cutting operations.

Cutting mechanism

Figures 9, 11:
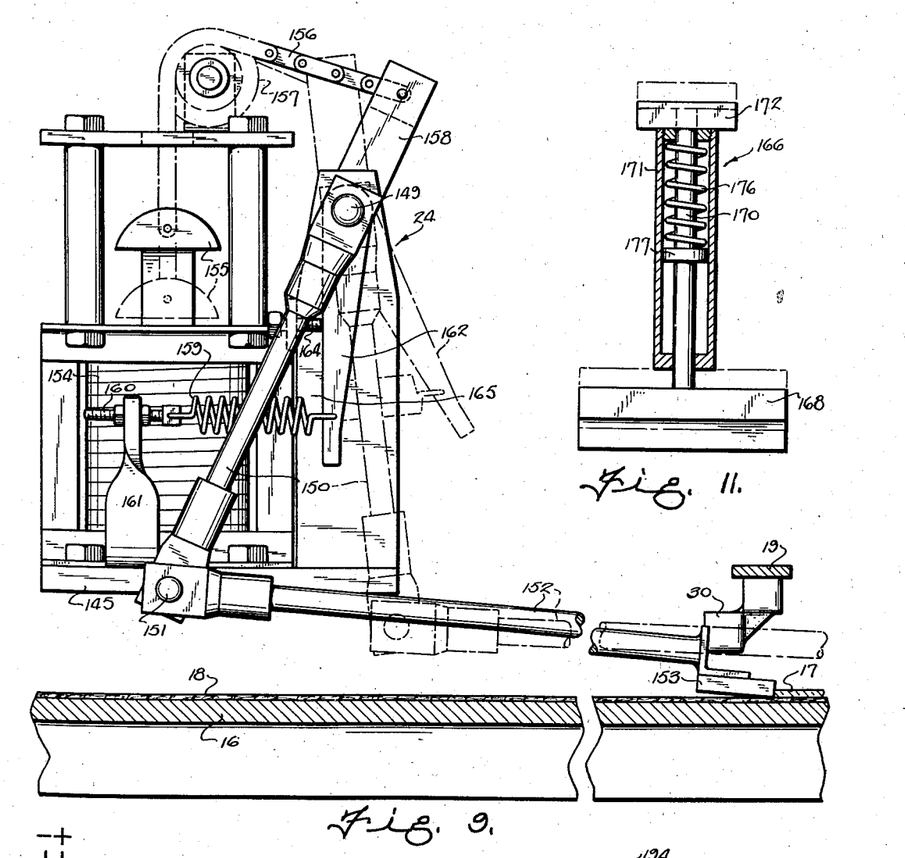
Fig. 9 is a vertical longitudinal section taken substantially on line 9—9 of Fig. 1 showing in side elevation the automatic kicking device for ejecting the glass sheet from the cutting table after the cutting operation.
Fig. 11 is a detail section through a portion of one of the glass sheet locating switches.

The template 19 for supporting and guiding the cutting unit 20 preferably consists of a relatively narrow track of the desired shape and size supported horizontally above the cutting table by bracket arms 30 and 31 carried at their outer ends by a longitudinally extending supporting bar 32 mounted upon fixed posts 33 suitably carried by the table structure 15. As shown in Fig. 9, the bracket arms 30 and 31 are associated with the template 19 in such a manner that they will not interfere with the travel of the cutting unit around said template.

Figure 1:
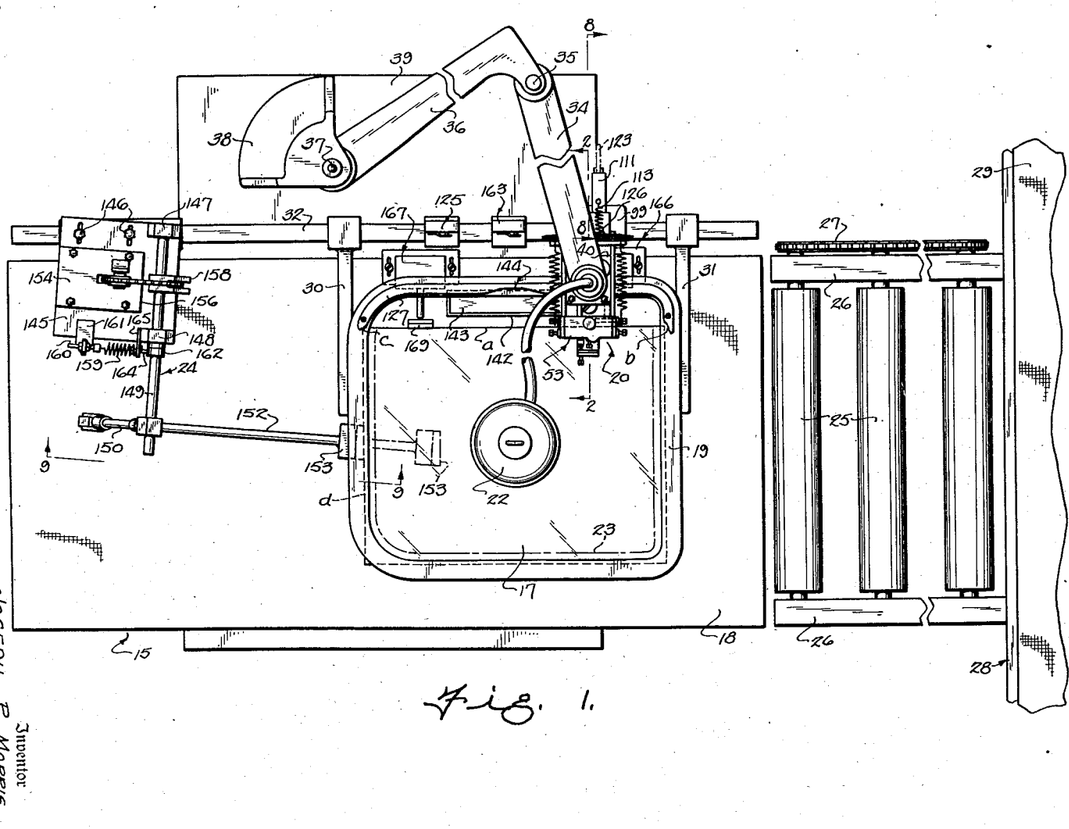
Fig. 1 is a plan view of a cutting machine constructed in accordance with the present invention.
Figure 2:
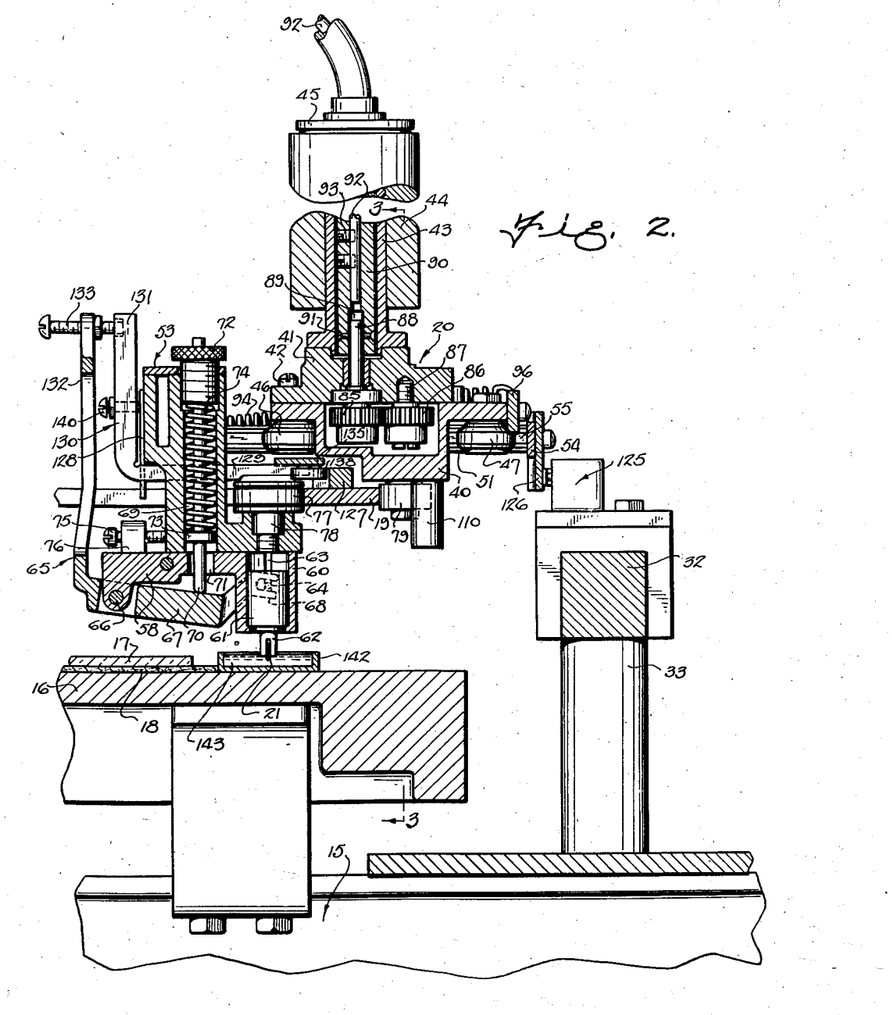
Fig. 2 is a vertical section through the cutting unit taken substantially on line 2—2 of Fig. 1.
Figure 3:
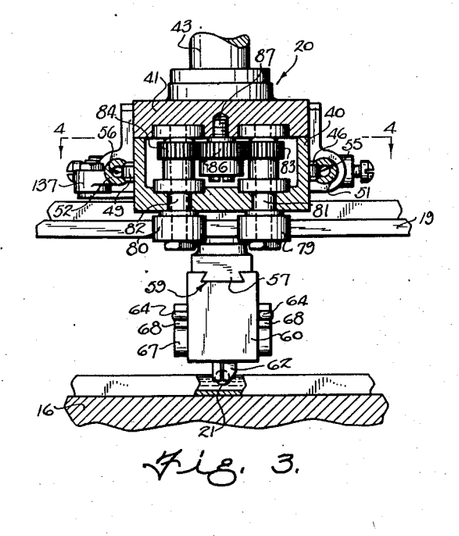
Fig. 3 is a vertical section through the cutting unit taken substantially on line 3—3 of Fig. 2.
Figure 4:
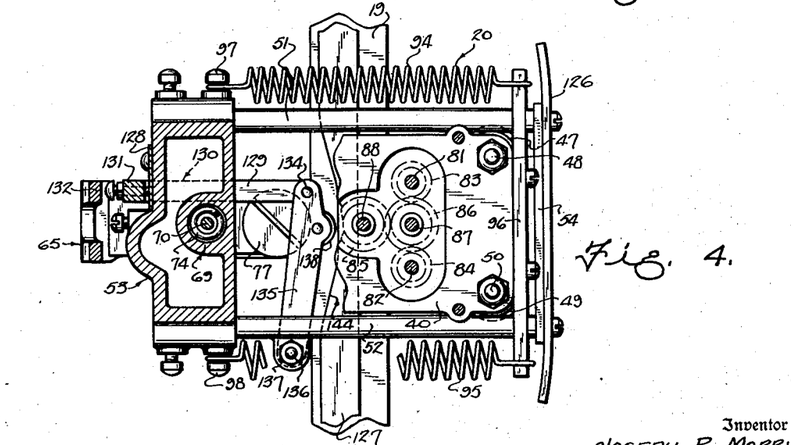
Fig. 4 is a horizontal section through the cutting unit taken substantially on line 4—4 of Fig. 3.

As shown in Fig. 1, the cutting unit 20 is carried at the outer end of a horizontal supporting arm 34 hinged at its inner end as at 35 to a second horizontal arm 36 which is pivotally mounted at its inner end as at 37 to a bracket 38 secured upon a platform 39 which may also be carried by the table structure 15.

With reference particularly to Figs. 1, 2, 3 and 4, the cutting unit 20 comprises a housing 40 provided with a removable top plate 41 secured in place by screws or the like 42. Fastened to the top plate 41 of the housing 40 by screws or the like is a vertical bushing 43 which is rotatably mounted in a bearing sleeve 44 formed at the outer end of the horizontal supporting arm 34, said bushing 43 projecting above said bearing sleeve 44 and having threaded thereon a nut 45 which serves to secure the cutting unit to said supporting arm.

Carried by the housing 40 at one side thereof is a pair of spaced guide wheels 46 and 47 freely rotatable upon vertical pins 48, while a pair of similar guide wheels 49 are carried at the opposite side of said housing upon vertical pins 50. The housing 40 is slidably received between a pair of horizontal parallel rods 51 and 52 carried at one end by a cutter head 53 and connected together at their opposite ends by a cross strap 54. The inner sides of rods 51 and 52 are cut away as indicated at 55 and 56 (Fig. 3) to provide grooved tracks for the guide wheels 46—47 and 49 respectively.

The cutter head 53 is hollow and is formed at its lower end with a dovetailed rib 57 (Fig. 3) carrying a horizontal plate 58 provided in its upper surface with an undercut groove 59 receiving the rib 57 therein. The horizontal plate 58 is provided at its inner end with a well 60 in which is received a cylindrical cutter holder 61, said cutter holder having a depending reduced portion 62 projecting through an opening in the bottom of said well and carrying the rotatable steel cutting wheel 21.

The side wall of the well 60 is provided with aligned vertical slots 63 and carried by the cutter holder 61 are horizontal pins 64 which project outwardly through said slots. Carried at the outer end of the plate 58 remote from well 61 is a vertical L-shaped lever 65, said lever being pivoted intermediate its ends to the plate 58 as at 66 and having the horizontal portion 67 thereof bifurcated at its outer end to provide spaced legs 68 which straddle the well 60 and engage the pins 64.

The cutter head 53 is provided with a vertical opening 69 in which is mounted a vertical pressure pin 70, said pin projecting downwardly through an opening 71 in the plate 58 and engaging the horizontal portion 67 of lever 65. Threaded within the upper end of the opening 69 is a nut 72, while formed upon pressure pin 70 adjacent its lower end is an annular flange 73. Arranged within the opening 69 and encircling pressure pin 70 is a compression spring 74 which bears at its upper end against the nut 72 and at its lower end against the flange 73, thereby acting to normally urge the pressure pin downwardly to engage the horizontal portion 67 of lever 65. With this construction, the cutting wheel 21 will be yieldably maintained in engagement with the glass sheet 17, while the pressure of the cutting wheel upon the glass can be regulated by proper adjustment of the nut 72 to control the compression of spring 74. The plate 58 may be adjusted horizontally relative to cutter head 53 to vary the position of the cutting wheel 21 by means of a set screw 75 which passes through a boss 76 on the plate 58 and engages the cutter head 53.

Carried by the cutter head 53 is a freely rotatable guide roller 77 mounted upon a vertical stub shaft 78 and adapted to engage one vertical side edge of template 19. Carried by the housing 40 and adapted to engage the opposite vertical side edge of the template are the spaced guide rollers 79 and 80, the guide roller 77 engaging the template at a point intermediate the two guide rollers 79 and 80. The guide rollers 79 and 80 are positively driven and to this end are carried at the lower ends of vertical drive shafts 81 and 82 rotatably mounted in the bottom of housing 40. Keyed to the upper ends of the shafts 81 and 82 within housing 40 are gears 83 and 84 respectively.

The guide rollers 79 and 80 are driven through a train of gears arranged in the housing 40 and including a drive gear 85 and an intermediate gear 86. The intermediate gear 86 is rotatable upon a vertical screw 87 threaded in the top 41 of housing 40 and is located between the gears 83 and 84 as clearly shown in Figs. 3 and 4. The drive gear 85 is keyed to the lower end of a vertical stub shaft 88 secured at its upper end within a vertical bore 89 formed in a cylindrical bearing 90 which is arranged within the bushing 43, said bearing being keyed to the upper end of the stub shaft 88 by screws or the like 91.

Also received within the bore 89 in bearing 90 is one end of a flexible shaft 92 secured to said bearing by set screws or the like 93. The flexible shaft 92 is connected at its opposite ends with the motor 22 which may be suspended a suitable distance above the cutting table or mounted in any desired manner. Upon operation of the motor 22, the flexible shaft 92 turning bearing 90 will effect rotation of drive gear 85, and this rotary movement will be transmitted to the guide rollers 79 and 80 through the gears 86, 83 and 84 respectively. The positive rotation of the guide rollers 79 and 80 will cause the cutting unit 20 to be driven around the template 19.

It is of course essential in the operation of the machine that the cutting edge of the rotatable steel cutting wheel 21 be always maintained tangent to the line of cut if a satisfactory cut is to be made, and the same is equally true when using a cutting diamond instead of a rotatable steel wheel. The provision of the guide rollers 77, 79 and 80, together with the fact that the cutting wheel is prevented from rotating about an axis extending perpendicular to the glass sheet, serves to maintain the cutting wheel tangent to the line of cut as the cutting unit is propelled around the template.

The guide rollers 77, 79 and 80 are yieldably maintained in engagement with the template 19 by the action of tension springs 94 and 95 fastened at one end to a transverse strip 96 carried at the outer end of housing 40 and at their opposite ends to screws 97 and 98 respectively carried by the cutter head 53. These springs serve to draw the housing 40 and cutter head 53 toward one another and maintain the guide rollers carried thereby in yieldable engagement with opposite side edges of the template.

*Stop means for cutting unit*

As brought out above, when the motor 22 is placed in operation, the cutting unit 20 will be driven around the track template 19, with the cutting wheel 21 scoring the glass sheet 17 along the line 23 in Fig. 1. It is preferred that the cutting unit be positively driven through only a portion of its cutting cycle and then permitted to coast the balance of its cycle. In order to reduce the shock of sudden stopping and the tendency of the cutting unit to rebound, the machine herein provided embodies means for first slowing down the speed of the cutting unit as it approaches the end of its cutting cycle and then bringing the same to a stop and maintaining it in such position until it is desired to repeat the cutting operation.

The cutting unit stop means is best illustrated in Figs. 2, 6, 7 and 8 and comprises a horizontal plate 99 arranged at the back of the cutting table intermediate the ends thereof and secured to the longitudinally extending supporting bar 32 by bolts or the like 100. Mounted upon the plate 99 is a pair of opposed levers 101 and 102 pivoted thereto as at 103 and 104 respectively. Carried at the free ends of the levers 101 and 102 are depending pins 105 and 106 respectively which pass through slots 107 and 108 in plate 99 and are connected by a tension spring 109 which functions to normally draw the levers 101 and 102 together.

Figure 6:
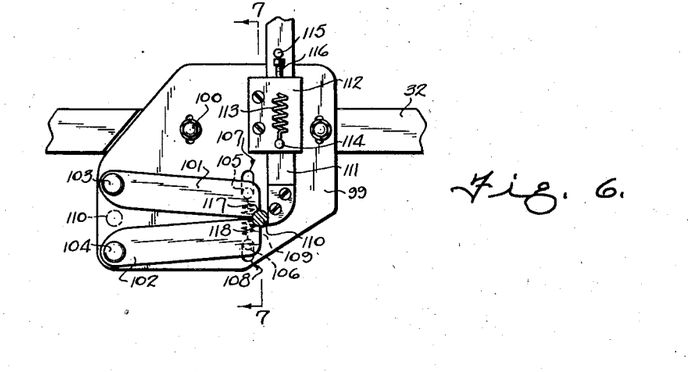
Fig. 6 is a plan view of the means for bringing the cutting unit to a stop after the completion of its cutting cycle.
Figure 7:
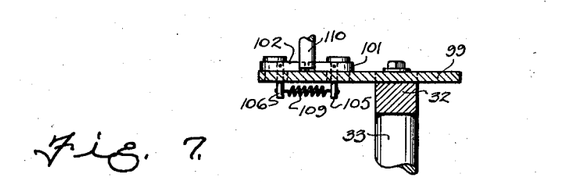
Fig. 7 is a transverse section taken substantially on line 7—7 of Fig. 6.
Figure 8:
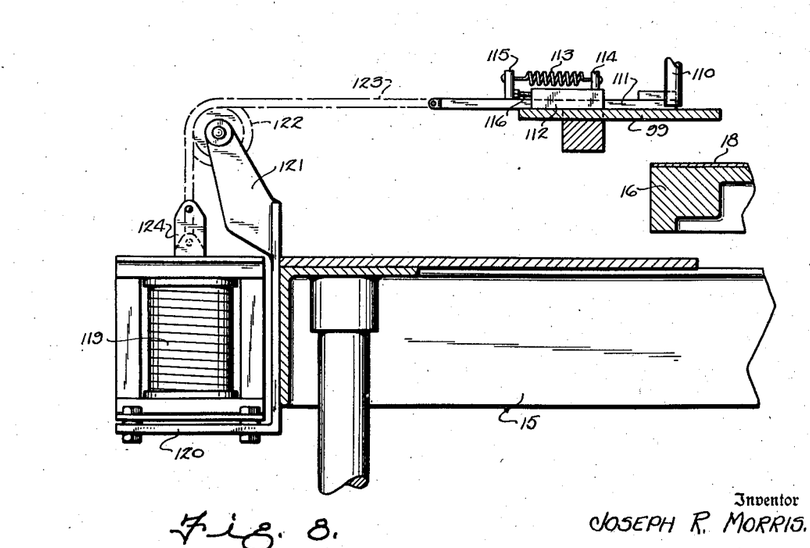
Fig. 8 is a vertical section taken substantially on line 8—8 of Fig. 1 showing the cutting unit stop means.

Carried by and depending from the housing 40 of cutting unit 20 is a stop pin 110, and as the cutting unit approaches the end of its cutting cycle, this stop pin passes between the levers 101 and 102 as indicated in broken lines in Fig. 6, whereupon the frictional engagement of the said levers with the said pin will cause a slowing down of the cutting unit. Although this serves to cut down the speed of travel of the cutting unit, the said unit will, however, not be brought to a stop until the stop pin 110 passes beyond the said levers 101 and 102 and engages the inner end of a stop bar 111 extending transversely of the cutting table.

The stop bar 111 is horizontally slidable through a guide block 112 carried by plate 99 and is normally maintained in the path of travel of the stop pin 110 by a spring 113 fastened at one end to a post 114 on guide block 112 and at its opposite end to a post 115 carried by stop bar 111. The inward movement of the stop bar is limited by a horizontal set screw 116 threaded in guide block 112 and engageable by post 115. By proper adjustment of the screw 116, the inward movement of the stop bar 111 can be accurately regulated.

The spring 113 serves to normally maintain the stop bar 111 in the position shown in Fig. 6 so that after the stop pin 110 on cutting unit 20 passes from between the levers 101 and 102, it will engage the inner end of said bar and bring the slowly moving cutting unit to a stop. The levers 101 and 102 are provided at their free ends with substantially semicircular notches 117 and 118 respectively in which the stop pin 110 is received when the cutting unit is brought to a stop and by means of which rebound of said cutting unit is prevented.

It will be evident from the above that the stop bar 111 not only acts to bring the cutting unit 20 to a stop but also preventred further movement of the unit until the said bar is withdrawn from out of the path of travel of stop pin 110. This is automatically accomplished at the proper time in the operation of the machine by a solenoid 119 (Fig. 8) supported by an angle bracket 120 suitably secured to the table structure 15. Carried at the upper end 121 of bracket 120 is a sprocket 122 and trained about said sprocket is a chain 123 connected at one end to the outer end of stop bar 111 and at its opposite end to the vertical plunger 124 of solenoid 119.

When the solenoid 119 is energized, the plunger 124 thereof will be moved downwardly to withdraw the stop bar 111 out of engagement with the stop pin 110 on cutting unit 20, thereby permitting travel of said unit around the template 19. Upon de-energization of the solenoid 119, the tension of the spring 113 will be sufficient to again move the stop bar 111 inwardly so that it will be in position to stop the cutting unit upon completion of its cutting cycle.

The energization of the solenoid 119 is also controlled by and dependent upon the accurate positioning of the glass sheet 117 upon the cutting table as will be more fully hereinafter described, while the deenergization of said solenoid is controlled by a switch 125 (Fig. 1) secured to the supporting bar 32 and adapted to be actuated by a plate 126 carried by the cutting unit. More specifically, the plate 126 serves to open the switch 125 to break the circuit through solenoid 119 and thereby permit the stop bar 111 to be returned to operative position so that it will stop the cutting unit 20 when said unit reaches the end of its cutting cycle. The opening of the switch 125 is also adapted to shut off the motor 22 so that the cutting unit will coast the balance of its cutting cycle.

Cutting tool lowering and raising means

For the purpose of preventing chipping or spalling of the rear edge $a$ of the glass sheet 17 as the cutting wheel 21 passes onto the sheet at the beginning of the cutting operation and from said sheet at the completion of the cutting operation as well as for preventing injury to the cutting wheel, means is provided for placing the cutting wheel upon the sheet slightly inwardly of the rear edge $a$ thereof at the beginning of the cutting operation and for also lifting the cutting wheel from the sheet just before it reaches the edge $a$ at the completion of the cutting operation. This lowering and raising of the cutting wheel is controlled by a cam member 127 in the form of a relatively narrow metal strip secured to the top of the template 19 at the back thereof, in conjunction with cooperating means carried by the cutter head 53 of the cutting unit.

Secured to the cutter head 53 is a vertical plate 128 provided at its lower end with a guide slot through which is slidably received the horizontal portion 129 of an L-shaped bracket 130. The vertical portion 131 of said bracket is disposed inwardly of and substantially parallel with the vertical portion 132 of the L-shaped lever 65. Passing through the upper end of lever 65 is a set screw 133 having its inner end engaged in a recess in the upper end of L-shaped bracket 130. Upon horizontal sliding movement of the L-shaped bracket 130 through guide plate 128, the L-shaped lever 65 is adapted to be rocked about its pivot 66 to effect the raising or lowering of the cutting wheel 21. The horizontal portion 129 of L-shaped lever 130 is pivoted at its outer end as at 134 (Fig. 4) to one end of a horizontal transverse link 135 pivotally mounted at its outer end as at 136 to a bracket 137 carried by horizontal rod 52. Carried by the link 135 is a freely rotatable roller 138 which is adapted to engage the inner edge of the cam member 127 as the cutting unit travels around the template.

Figure 5:
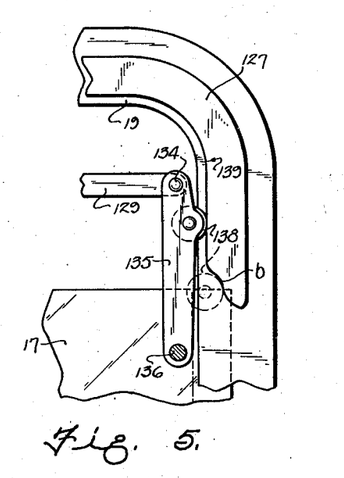
Fig. 5 is a detail plan view showing the means for placing the cutting tool upon the glass sheet slightly inwardly of the edge thereof at the beginning of the cutting operation.

When the motor 22 is placed in operation to start the cutting unit 20 around the template 19, the roller 138 on the cutting unit will be in engagement with the inner edge 139 of the cam member 127, at which time the L-shaped bracket 130 will be in its outer position and the L-shaped lever 65 rocked in a counter-clockwise direction to effect the raising of the cutting wheel 21. However, upon continued movement of the cutting unit and when the roller 138 passes onto the narrowed end portion $b$ of the cam member 127, as indicated in broken lines in Fig. 5, the compression spring 74 acting through the pressure pin 70 upon the horizontal portion 67 of L-shaped lever 65 will rock said lever in a clockwise direction to move the L-shaped bracket 130 inwardly and the cutting wheel 21 downwardly into engagement with the glass sheet. The inward movement of the L-shaped bracket 130 can be regulated by a set screw 140. In this way, the cutting wheel 21 will be lowered upon the glass sheet 17 slightly inwardly of the rear edge $a$ thereof. The cutting wheel 21 is also raised in the same manner by engagement of the roller 138 with the forward end $c$ of cam member 127 just before it reaches the rear edge $a$ of the sheet at the completion of the cutting operation.

Cutting wheel oiler

To facilitate the cutting of the glass sheets, the machine herein provided includes means for effecting an automatic oiling of the cutting wheel 21 between successive cutting operations. To this end, there is secured upon the top 16 of the cutting table along the back thereof a rectangular pan 142 containing a supply of oil 143. The cam member 137 is provided above the oil pan 142 and in the inner edge thereof with a cutback or recessed portion 144. As the roller 138 of cutting unit 20 passes into the recessed portion 144 of the cam member, the L-shaped lever 130 will be moved inwardly by the action of the spring 74 and the cutting wheel 21 urged downwardly. Upon lowering of the cutting wheel, it will be dipped into the supply of oil 143 and as the cutting unit moves beyond the recessed portion 144, the cutting wheel will again be moved to raised position. In other words, the action of lowering and then raising the cutting wheel during oiling is the same as the lowering of the cutting wheel upon the glass sheet at the beginning of the cutting operation and the subsequent lifting therefrom at the completion of the cutting operation as explained above.

Sheet kicker device

The present machine also embodies the provision of means for automatically ejecting the glass sheet 17 from the cutting table 16 after the cutting operation and for delivering it onto the conveyor rollers 25 from which it passes to the take-off conveyor 28. This is accomplished by the sheet kicker device 24 illustrated in Figs. 1 and 9 and comprising a horizontal base plate 145 secured to the supporting bar 32 by bolts or the like 146. Carried upon the base plate 145 are spaced bearings 147 and 148 within which is journaled a horizontal shaft 149 extending transversely of the cutting table. Keyed to the forward end of shaft 149 is a depending lever 150 to the lower end of which is pivoted as at 151 a substantially horizontal pusher arm 152 provided at its forward end with a pusher block 153 preferably of rubber. The pusher block 153 rests freely upon the top of the cutting table and is adapted to engage the adjacent side edge $d$ of the glass sheet 17.

The pusher arm 152 is operated by a solenoid 154 mounted upon the base plate 145 and provided with a vertically movable plunger 155. Fastened to the plunger 155 is one end of a sprocket chain 156 which passes upwardly and over a sprocket wheel 157 and is attached at its opposite end to the upper end of an upstanding plate 158 keyed to shaft 149 intermediate the ends thereof. Upon energization of the solenoid 154, the plunger 155 thereof will be drawn downwardly to effect the rocking of the shaft 149 in a counter-clockwise direction to move the pusher arm 152 forwardly as indicated in broken lines, whereupon the pusher block 153 engaging the side edge $d$ of the glass sheet 17 will push the said sheet off of the cutting table onto conveyor rolls 25. When the solenoid is de-energized, the pusher arm will be automatically returned to inoperative position as shown in full lines by a tension spring 159 having one end attached to a set screw 160 carried by a fixed bracket 161 and its opposite end fastened to a depending leg 162 keyed to shaft 149.

In accordance with the invention, the kicker device 24 is automatically actuated by the cutting unit 20 after completion of the cutting operation. More particularly, there is carried by the supporting bar 32 a switch 163 (Fig. 1) connected in series with the solenoid 154 and actuated by the plate 126 carried by the cutting unit. Thus, after the plate 126 opens switch 125 to break the circuit through the motor 22 and the cutter stop solenoid 119, the plate 126 will momentarily close switch 163 to complete a circuit through the solenoid 154 and cause actuation of the pusher arm 152 to remove the cut sheet from the cutting table. The rearward movement of the pusher arm 152, upon de-energization of solenoid 154, is controlled by a set screw 164 carried by a fixed bracket 165.

*Operation and electric wiring of machine*

In the operation of the machine, the glass sheet 17 to be cut is first placed upon the top 16 of the cutting table beneath the template 19, as shown in Fig. 1, and, at this time, the cutting unit 20 is at the back of the template and held in such position by the stop bar 111 engaging stop pin 110. Also, at this time, the pusher arm 152 of kicker device 24 is in retracted position as shown in full lines in Figs. 1 and 9 so that it will not interfere with the placing of the glass sheet upon the cutting table. When the glass sheet is properly located upon the cutting table, the motor 22 is placed in operation to propel the cutting unit 20 around the template 19 and substantially simultaneously with the operation of motor 22 the solenoid 119 is energized to withdraw the stop bar 111 from engagement with stop pin 110. As the cutting unit travels around the template, the cutting wheel 21 will effect the scoring of the glass sheet along the line 23. After the scoring of the glass sheet has been completed, the motor 22 is automatically shut off and the solenoid 119 de-energized to permit the return of the stop bar 111 to operative position to bring the cutting unit to a stop. The kicker device 24 is then automatically actuated to eject the cut sheet from the cutting table.

Figure 10:
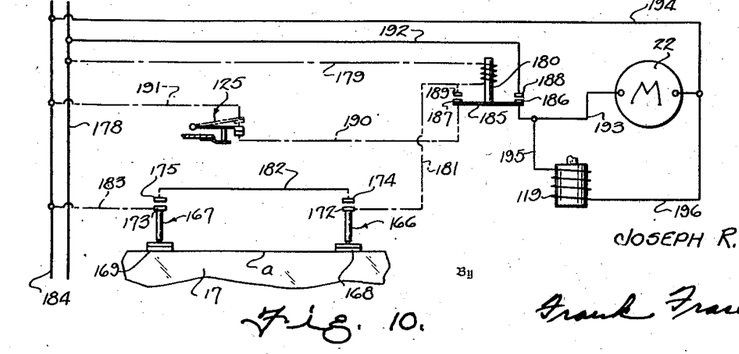
Fig. 10 is an electrical wiring diagram illustrating the operation of the various parts of the machine.

The cutting of the glass sheet is initiated by and dependent upon the accurate positioning of the said sheet upon the cutting table, while the stopping of the machine and actuation of the kicker device is controlled by the cutting unit. To this end, and with reference particularly to Figs. 10 and 11, there is arranged at the back of the cutting table 17 two contact switches 166 and 167 including stop blocks 168 and 169 respectively against which the rear edge *a* of the glass sheet is adapted to abut. Each stop block 168 and 169 is carried at the forward end of a horizontal plunger 170 slidable through a cylinder 171, the plungers 170 of switches 166 and 167 being provided at their inner ends with movable contacts 172 and 173 respectively cooperating with fixed contacts 174 and 175. The plunger 170 of each switch 166 and 167 is normally urged forwardly by a spring 176 contained in housing 171 and engaging a collar 177 on said plunger whereby to normally maintain the movable contact 172 or 173 out of engagement with the respective fixed contact 174 or 175.

The switches 166 and 167 are therefore normally open but are adapted to be momentarily closed by the glass sheet when it is placed upon the cutting table and moved rearwardly to engage the stop blocks 168 and 169 forcing them rearwardly to cause the movable contacts 172 and 173 to engage stationary contacts 174 and 175. When this is done, a circuit will be completed through the switches 166 and 167, whereupon current will pass from the positive main line 178 through wire 179, electro-magnet 180, wire 181, switch 166, wire 182, switch 167 and wire 183 to the negative main line 184. The electromagnet 180 also comprises part of a holding circuit and includes a bar 185 carrying contacts 186 and 187, said bar being movable upwardly upon energization of the electromagnet 180 to bring the contacts 186 and 187 into engagement with contacts 188 and 189 respectively. When this occurs, the holding circuit is completed so that current will enter through the wire 179 and pass through the electromagnet 180, contacts 189—187, wire 190, switch 125 and wire 191 to the negative main line 184. In other words, the switches 166 and 167 need only be closed momentarily to effect energization of the electromagnet 180 and the completion of the holding circuit through switch 125. As soon as the operator releases the glass sheet which he has moved rearwardly on the cutting table, it will be moved slightly forwardly again by the stop blocks 168 and 169, under the action of the spring 176. This movement of the stop blocks will also return the switches 166 and 167 to their normally open position. Upon upward movement of the bar 185 and completion of the holding circuit, the contacts 186—188 will also engage one another to complete the operating circuit through the motor 22 and solenoid 119. This operating circuit includes wire 192, contacts 188—186, and wire 193 leading to motor 22, while running from said motor is a wire 194 to the negative main line 184. Connected to wire 193 is a wire 195 to solenoid 119, while leading from the solenoid 119 is a wire 196 connected to wire 194.

Upon completion of the operating circuit, the solenoid 119 will be energized to withdraw the stop bar 111 from in front of stop pin 110 on cutting unit 20 and substantially simultaneously the motor 22 will be placed in operation to propel the cutting unit around the template 19 to effect the scoring of the glass sheet. After the scoring of the glass sheet has been completed and the cutting unit nears the end of its cutting cycle, the plate 126 carried thereby will effect the opening of switch 125 to break the holding circuit through the electromagnet 180. When this is done, the bar 185 will be lowered to move contacts 186 and 187 out of engagement with contacts 188 and 189 and thereby break the operating circuit through the motor 22 and solenoid 119. When the circuit through the motor is broken, the positive driving of the cutting unit will be discontinued and the said unit will be permitted to coast through the remainder of its cutting cycle. Upon breaking of the circuit through the solenoid 119, the stop bar 111 will be returned to operative position by the spring 113 to bring the cutting unit to a stop.

After opening the switch 125 and upon continued movement thereof, the plate 126 on cutting unit 20 will close the switch 163 to effect energization of the solenoid 154 of kicker device 24. Upon energization of solenoid 154, the shaft 149 will be rocked in a counter-clockwise direction to move the pusher arm 152 forwardly as shown in broken lines in Fig. 9, whereupon the pusher block 153 engaging the side edge *d* of the glass sheet 17 will push the said sheet off of the cutting table onto the conveyor rollers 25. As soon as the cutting unit passes beyond switch 163 it will again be opened and the solenoid 154 de-energized, whereupon the pusher arm 152 will be returned to inoperative position by the action of spring 159.

From the above, it will be seen that the operation of the cutting unit is initiated by proper positioning of the glass sheet upon the cutting table and that this operation is dependent upon the closing of both of the switches 166 and 167 since they are connected in series with one another. Inasmuch as it is necessary for both switches to be closed before the holding and operating circuits can be completed, it will insure that the glass sheet to be cut is accurately placed upon the table. It will also be apparent from the above that the cutting of the glass sheet and its subsequent removal from the cutting table is accomplished automatically and that no further action is required by the operator once he has properly located the glass sheet upon the cutting table to effect closing of the switches 166 and 167.

It is to be understood that the form of the invention herewith shown and described is to be taken as a preferred embodiment of the same, and that various changes in the shape, size and arrangement of parts may be resorted to without departing from the spirit of the invention or the scope of the subjoined claims.

I claim:

1. In a machine for cutting glass sheets or plates or other sheet material, a table for supporting the sheet to be cut, a template mounted above said table, a cutting unit mounted upon and adapted to travel around said template including a cutting tool for scoring the sheet, and means operable automatically by the cutting unit when it reaches a predetermined position for ejecting the sheet from the cutting table after the cutting operation.

2. In a machine for cutting glass sheets or plates or other sheet material, a table for supporting the sheet to be cut, a template mounted above said table, a cutting unit mounted upon and adapted to travel around said template including a cutting tool for scoring the sheet, means for ejecting the sheet from the cutting table after the cutting operation, and means controlled by movement of the cutting unit for actuating said sheet ejecting means.

3. In a machine for cutting glass sheets or plates or other sheet material, a table for supporting the sheet to be cut, a template mounted above said table, a cutting unit mounted upon and adapted to travel around said template including a cutting tool for scoring the sheet, means for removing the sheet from the cutting table after the cutting operation including a pusher arm adapted to engage an edge of the sheet, and means operable by the cutting unit upon completion of the cutting operation for actuating said pusher arm.

4. In a machine for cutting glass sheets or plates or other sheet material, a table for supporting the sheet to be cut, a template mounted above said table, a cutting unit mounted upon and adapted to travel around said template including a cutting tool for scoring the sheet, means for removing the sheet from the cutting table after the cutting operation including a pusher arm adapted to engage an edge of the sheet, a solenoid operatively connected with said pusher arm, and a switch connected in series with said solenoid and adapted to be closed by the cutting unit upon completion of the cutting operation to cause the energization of said solenoid and the actuation of said pusher arm.

5. In a machine for cutting glass sheets or plates or other sheet material, a table for supporting the sheet to be cut, a template mounted above said table, a cutting unit mounted upon and adapted to travel around said template including a cutting tool for scoring the sheet, means for removing the sheet from the cutting table after the cutting operation including a pivotally mounted pusher arm freely supported upon the cutting table and adapted to engage an edge of the sheet, a solenoid operatively connected with said pusher arm, a switch connected in series with said solenoid and adapted to be closed by the cutting unit upon completion of the cutting operation to cause the energization of said solenoid and the actuation of said pusher arm, and means for returning the pusher arm to inoperative position after the sheet has been pushed from the cutting table.

6. In a machine for cutting glass sheets or plates or other sheet material, a table for supporting the sheet to be cut, a cutting unit mounted above said table for travel along a predetermined path and including a cutting tool for scoring the sheet, a motor for driving the cutting unit along said path, and a pair of switches connected in series with one another and adapted to be closed by the sheet only upon proper positioning thereof upon the cutting table to effect completion of a circuit through said motor to place the same in operation.

7. In a machine for cutting glass sheets or plates or other sheet material, a table for supporting the sheet to be cut, a cutting unit mounted above said table for travel along a predetermined path and including a cutting tool for scoring the sheet, a motor for driving the cutting unit along said path, a pair of switches connected in series with one another and adapted to be closed by the sheet only upon proper positioning thereof upon the cutting table to effect completion of a circuit through said motor to place the same in operation, and means actuated by the cutting unit upon completion of the cutting operation to break the circuit through said motor.

8. In a machine for cutting glass sheets or plates or other sheet material, a table for supporting the sheet to be cut, a cutting unit mounted above said table for travel along a predetermined path and including a cutting tool for scoring the sheet, a motor for driving the cutting unit along said path, and a pair of switches connected in series with one another and including stop blocks against which one edge of the sheet is adapted to abut when placed upon the cutting table and for properly locating the said sheet upon the said table, the engagement of the sheet with said stop blocks serving to close said switches and thereby effect the completion of a circuit through said motor to place the same in operation.

9. In a machine for cutting glass sheets or plates or other sheet material, a table for supporting the sheet to be cut, a cutting unit mounted above said table for travel along a predetermined path and including a cutting tool for scoring the sheet, a motor for driving the cutting unit along said path, a pair of switches connected in series with one another and including stop blocks against which one edge of the sheet is adapted to abut when placed upon the cutting table and for properly locating the said sheet upon the said table, the engagement of the sheet with said stop blocks serving to close said switches and thereby effect the completion of a circuit through said motor to place the same in operation, and a switch adapted to be opened by the cutting unit upon completion of the cutting operation to break the circuit through said motor.

10. In a machine for cutting glass sheets or plates or other sheet material, a table for supporting the sheet to be cut, a cutting unit mounted above said table for travel along a predetermined path and including a cutting tool for scoring the sheet, a motor for driving the cutting unit along said path, a cutter stop means for preventing movement of said cutting unit along the said path, and a pair of switches connected in series with one another and adapted to be closed only upon proper positioning of the sheet upon the cutting table to effect completion of a circuit through said motor and cutter stop means to substantially simultaneously render the cutter stop means ineffective and place the motor in operation.

11. In a machine for cutting glass sheets or plates or other sheet material, a table for supporting the sheet to be cut, a cutting unit mounted above said table for travel along a predetermined path and including a cutting tool for scoring the sheet, a motor for driving the cutting unit along said path, a cutter stop means for preventing movement of said cutting unit along the said path, a pair of switches connected in series with one another and adapted to be closed only upon proper positioning of the sheet upon the cutting table to effect completion of a circuit through said motor and cutter stop means to substantially simultaneously render the cutter stop means ineffective and place the motor in operation, and means actuated by the cutting unit upon completion of the cutting operation for substantially simultaneously shutting off the said motor and rendering the said cutter stop means effective to bring the cutting unit to a stop.

12. In a machine for cutting glass sheets or plates or other sheet material, a table for supporting the sheet to be cut, a template mounted above said table, a cutting unit mounted upon and adapted to travel around said template including a cutting tool for scoring the sheet, a receptacle disposed along the path of travel of said cutting tool containing a supply of oil, and means for guiding the cutting tool into and out of the supply of oil after each cutting operation.

13. In a machine for cutting glass sheets or plates or other sheet material, a table for supporting the sheet to be cut, a template mounted above said table, a cutting unit mounted upon and adapted to travel around said template including a cutting tool for scoring the sheet, a receptacle disposed beneath said template containing a supply of oil, and coacting means carried by said template and cutting unit for causing the cutting tool to be dipped into the supply of oil after each cutting operation.

14. In a machine for cutting glass sheets or plates or other sheet material, a table for supporting the sheet to be cut, a template mounted above said table, a cutting unit mounted upon and adapted to travel around said template including a cutting tool for scoring the sheet, a receptacle disposed beneath said template containing a supply of oil, a cam member carried by said template and formed with a recessed portion above said receptacle, and means carried by the cutting unit engaging said cam member and adapted upon passing into the recessed portion thereof to cause said cutting tool to be dipped into the supply of oil and subsequently raised therefrom after each cutting operation.

15. In a machine for cutting glass sheets or plates or other sheet material, a table for supporting the sheet to be cut, a cutting unit mounted above said table for movement along a predetermined path including a cutting tool for scoring the sheet, means for ejecting the sheet from the cutting table after the cutting operation including a quick-acting picker adapted to engage an edge of the sheet, and means operable by the cutting unit upon completion of the cutting operation for actuating said picker.

JOSEPH R. MORRIS.